US010793121B2

(12) United States Patent
Goyez et al.

(10) Patent No.: US 10,793,121 B2
(45) Date of Patent: Oct. 6, 2020

(54) ARCHITECTURE FOR AN AIRCRAFT BRAKING SYSTEM

(71) Applicant: SAFRAN LANDING SYSTEMS, Velizy-Villacoublay (FR)

(72) Inventors: Brian Goyez, Velizy-Villacoublay (FR); François Bonigen, Velizy-Villacoublay (FR); Olivier Frey, Velizy-Villacoublay (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 153 days.

(21) Appl. No.: 16/183,520

(22) Filed: Nov. 7, 2018

(65) Prior Publication Data

US 2020/0023821 A1 Jan. 23, 2020

(30) Foreign Application Priority Data

Nov. 8, 2017 (FR) ...................... 17 60491

(51) Int. Cl.
*B64C 25/44* (2006.01)
*B60T 8/17* (2006.01)
*B60T 13/74* (2006.01)
*F16D 65/16* (2006.01)

(52) U.S. Cl.
CPC .......... *B60T 8/1703* (2013.01); *B60T 13/746* (2013.01); *B64C 25/44* (2013.01); *F16D 65/16* (2013.01)

(58) Field of Classification Search
CPC ....... B60T 8/1703; B60T 13/746; B64C 25/44
See application file for complete search history.

(56) References Cited

U.S. PATENT DOCUMENTS 6,003,640 A 12/1999 Ralea
2010/0332095 A1* 12/2010 Colin ................... B60T 8/1703
701/70

(Continued)

FOREIGN PATENT DOCUMENTS

EP 3 176 083 A1 6/2017

OTHER PUBLICATIONS

French Search Report dated Jul. 10, 2018, issued in corresponding French Application No. 1760491, filed Nov. 8, 2017, 2 pages.

*Primary Examiner* — Bradley T King
(74) *Attorney, Agent, or Firm* — Christensen O'Connor Johnson Kindness PLLC

(57) ABSTRACT

Generally described, an architecture for an aircraft braking system is provided. The architecture includes a brake having friction members and electromechanical actuators, each electromechanical actuator having an electric motor and a power module; a computer arranged to produce digital control signals; a power unit arranged to produce an electrical power supply for powering the electric motors; and a junction box disposed on the undercarriage. The junction box may be configured to receive and to distribute the electrical power supply. The junction box generally includes an electrical motor control module that produces digital motor command signals from the digital control signals, and an electrical converter module that converts the digital motor command signals into analog motor command signals for the power modules of the electromechanical actuators.

11 Claims, 3 Drawing Sheets

(56) References Cited

U.S. PATENT DOCUMENTS

| | | | |
|---|---|---|---|
| 2011/0100769 A1* | 5/2011 | Frank | B64C 25/44 |
| | | | 188/106 R |
| 2013/0253736 A1 | 9/2013 | Frank | |
| 2016/0001753 A1* | 1/2016 | Georgin | B60T 8/1703 |
| | | | 303/20 |
| 2017/0197606 A1* | 7/2017 | Kipp | B60T 8/885 |
| 2019/0126894 A1* | 5/2019 | Goyez | B60T 13/741 |
| 2019/0184951 A1* | 6/2019 | Frey | B64C 25/44 |
| 2019/0322359 A1* | 10/2019 | Arsenault | B60T 8/1703 |

* cited by examiner

ARCHITECTURE FOR AN AIRCRAFT BRAKING SYSTEM

BACKGROUND

Centralized architecture for an electric aircraft braking system controls multiple braked wheels of an aircraft. A known architecture is shown in FIG. 1, comprising a plurality of brakes 1, each serving to brake a wheel of an undercarriage of the aircraft. Each brake 1 has four electromechanical braking actuators 2 that are grouped together in two distinct groups, each of two electromechanical actuators 2. Both electromechanical actuators 2 in each distinct group are connected to a respective computer 3 for that group situated in the fuselage of the aircraft, above the undercarriage.

The electric motor of each electromechanical actuator 2 receives three-phase electrical power from the computer 3 to which the electromechanical actuator 2 is connected, and each electromechanical actuator 2 sends measurements of a servo-control parameter to the computer 3, e.g. measurements of the angular position of the rotor of the electric motor. The computers 3 perform monitoring and control functions on the electromechanical actuators 2, and also functions of generating power by using inverters.

It can be seen that that centralized architecture requires the use of at least ten electric wires per electromechanical actuator 2: three power supply wires 4 for the three phases of the electric motor; four communication wires 5 for returning measurements of the angular position of the rotor of the electric motor to a centralized computer 3; and two power supply wires (not shown in FIG. 1) for controlling a blocking member for blocking the electromechanical actuator 2 in order to perform a parking brake function.

The electric wires are integrated in harnesses that run from the fuselage of the aircraft to the brake 1, and are thus bulky and heavy. The long length of the harnesses in which the power supply wires 4 extend (and thus along which the power supply for the electric motors flows), requires the computers 3 to incorporate common mode filter circuits. These filter circuits increase the weight, the complexity, and the cost of the computers 3, and thus of the braking system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one or more aspects of the present disclosure, there is provided an architecture for an aircraft braking system. The architecture comprises: a brake for braking a wheel of an undercarriage of the aircraft, the brake comprising friction members and electromechanical actuators for applying a braking force to the friction members and thereby exerting braking torque on the wheel, each electromechanical actuator comprising an electric motor and a power module; a computer situated in a fuselage of the aircraft and arranged to produce digital control signals; a power unit situated in the fuselage of the aircraft and arranged to produce an electrical power supply for powering the electric motors; and a junction box situated on the undercarriage, the junction box being connected to the computer, to the power unit, and to the electromechanical actuators, the junction box being arranged to receive the electrical power supply and to distribute it to the electromechanical actuators, the junction box including an electrical motor control module that produces digital motor command signals from the digital control signals, the junction box also including an electrical converter module that converts the digital motor command signals into analog motor command signals for the power modules of the electromechanical actuators.

The use of the junction box serves to mutualize the generation of the analog motor command signals, and thus to reduce the number of wires running from the fuselage of the aircraft to the brake. The number of components needed for performing functions that can be mutualized in the junction box is also reduced, thereby reducing the weight and the complexity of the braking system, and its reliability is also improved.

Other characteristics and advantages of the disclosure appear on reading the following description of particular, non-limiting embodiments of the disclosure.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

In some embodiments, the disclosure is implemented on an aircraft that has a plurality of main undercarriages, each carrying a plurality of so-called "braked" wheels, i.e. a plurality of wheels, each fitted with a brake for braking the aircraft. The present description relates to a single braked wheel, but the disclosure naturally applies in the same manner to all of the braked wheels of the aircraft, or to a fraction of them.

Figure 2:
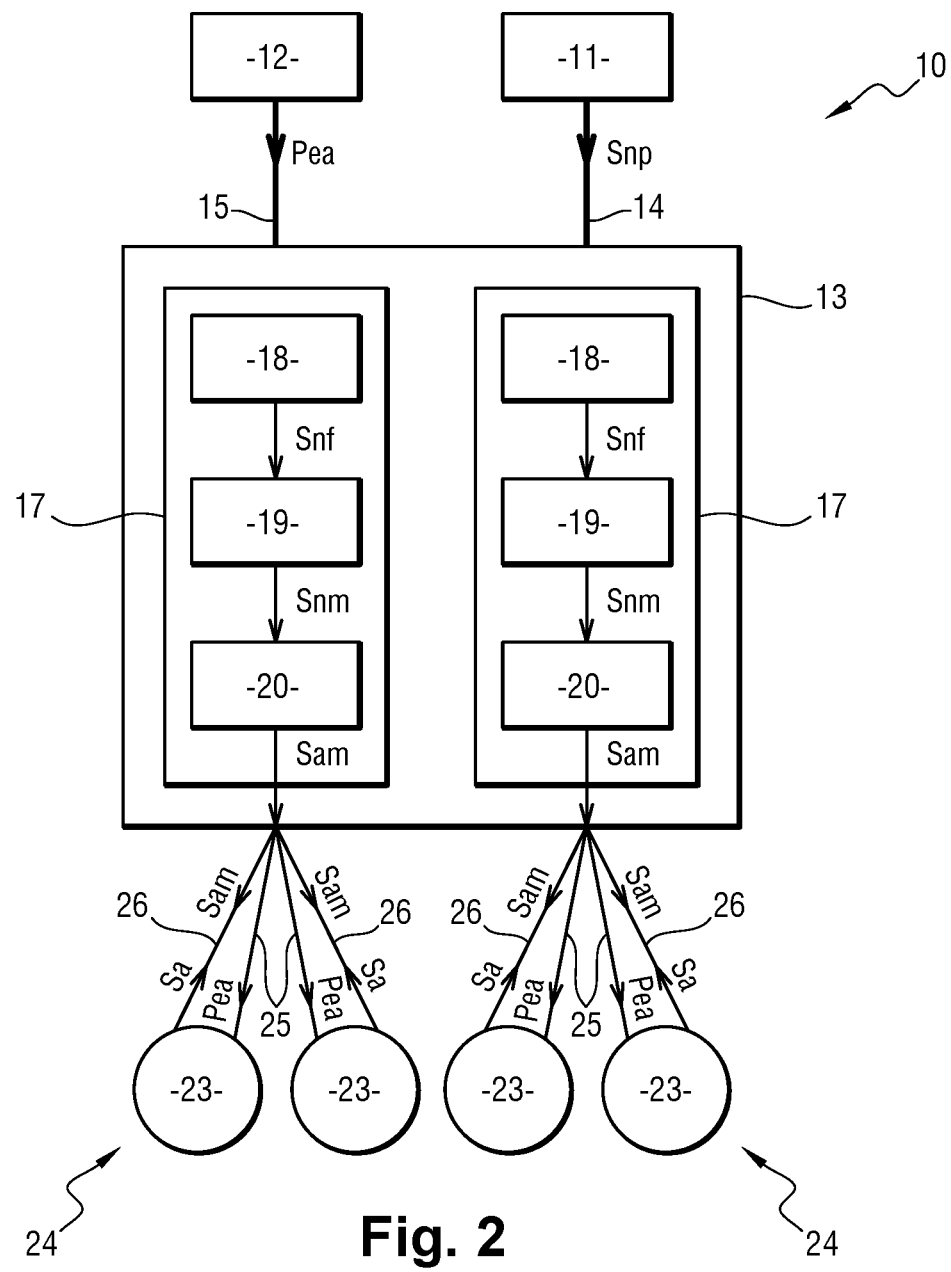
FIG. 2 shows one representative embodiment of an architecture for a braking system in accordance with one or more aspects of the present disclosure.

With reference to FIG. 2, an architecture 10 for an aircraft braking system in a first embodiment of the disclosure comprises a computer 11, a power unit 12, a junction box 13, and a brake for a wheel of a main undercarriage.

In some embodiments, the computer 11 is integrated in an avionics network of the aircraft and it is positioned in a bay that is situated in the fuselage of the aircraft. In this example, the computer 11 forms part of the set of ATA42 integrated modular avionics systems.

The computer 11 acquires a braking order, e.g. generated by a pilot of the aircraft or by an automatic braking system, and it transforms the braking order into digital control signals Snp. The digital control signals Snp comprise a braking setpoint.

In some embodiments, the power unit 12 is a power bus conveying electrical power coming from an electricity generator of the aircraft, from electricity storage means of the aircraft, such as a battery bank, one or more ultracapacitors, etc., or from a power converter unit connected to the power bus. Such a power converter unit can also be referred to as a power supply unit (PSU). The power unit 12 produces an electrical power supply Pea.

In some embodiments, the junction box 13 is situated on the main undercarriage. The junction box 13 may be situated on any portion of the main undercarriage: on a leg; an axle; inside the axle; on the brake itself; etc.

In these embodiments, the junction box 13 is connected to the computer 11 via a digital bus 14, and to the power unit 12 via a power cable 15. By way of example, the digital bus 14 may be an AFDX bus or a µAFDX bus.

In some embodiments, the digital bus 14 and the power cable 15 run from the fuselage of the aircraft to the junction box 13 via the main undercarriage.

Firstly, the junction box 13 in some embodiments includes distribution components (not shown). The distribution components are connected to the power cable 15 and they are arranged to receive the electrical power supply Pea and to distribute such Pea to the brake.

In some embodiments, the junction box 13 also has two control channels 17 that are dissimilar and distinct, with no electrical interaction between them.

The term "dissimilar" is used herein to mean that each control channel 17 comprises a different complex electrical component for performing the same function. The term "complex" is defined in the standards enabling aircraft to satisfy certification requirements (e.g. the standard DO 254 or the standard DO 178). By way of example, the complex electrical component may be a field programmable gate array (FPGA), or an application specific integrated circuit (ASIC). Dissimilarity serves to avoid a common mode failure of the complex electrical component leading to a total loss of braking on a wheel.

In this example, each control channel 17 comprises an electrical braking control module 18, an electrical motor control module 19, and an electrical converter module 20. In some embodiments, the electrical braking control module 18 is positioned upstream from the electrical motor control module 19, which is positioned upstream from the electrical converter module 20. The term "upstream" is used to mean towards the side from which the braking order comes, as contrasted with towards the brake.

In each control channel 17, the electrical braking control module 18 receives the braking setpoint from the computer 11 via the digital bus 14, and it implements high level braking control relationships in order to produce digital braking command signals Snf.

The electrical motor control module 19 acquires the digital braking command signals Snf and implements motor servo-control loops for producing digital motor command signals Snm. The digital motor command signals Snm are thus produced from the digital braking command signals Snf and thus from the digital control signals Snp comprising the braking setpoint.

The electrical converter module 20 comprises a digital-to-analog converter (DAC). The electrical converter module 20 acquires the digital motor command signals Snm and converts the digital motor command signals Snm into analog motor command signals Sam. The analog motor command signals Sam comprise analog command signals for inverters, which command signals may be constituted by way of example by pulse width modulation signals.

It will be appreciated that the junction box 13 also exchanges information with the computer 11 over the digital bus 14.

The brake serves to brake or slow the rotation of the wheel of the aircraft. The brake comprises an actuator carrier having four electromechanical actuators 23 mounted thereon, together with friction members, in some embodiments a stack of carbon disks.

The four electromechanical actuators 23 are used to apply a braking force to the stack of carbon disks so as to exert a braking torque on the wheel in order to slow down the rotation of the wheel, and thus brake the aircraft while it is on the ground.

Each electromechanical actuator 23 comprises a pusher and a body fastened to the actuator carrier. A power module, an electric motor, and a mechanical module are integrated inside the body of the electromechanical actuator 23.

The power module has electrical components for converting direct current (DC) power into alternating current (AC) power, in particular inverters, together with electrical filter components. The power module generates the three-phase electricity that passes through the windings of a stator of the electric motor. The mechanical module transforms rotary motion of an outlet shaft of the electric motor into a linear movement of the pusher.

The pusher is actuated by the electric motor via the mechanical module so as to slide and apply the braking force against the stack of carbon disks.

Each electromechanical actuator 23 also has a blocking member for performing a parking brake function. The blocking member is arranged to hold the outlet shaft of the electric motor in a given position so as to keep the pusher blocked in position.

In some embodiments, the electromechanical actuator 23 also has sensors that measure operating parameters of the electromechanical actuator 23. The measurements taken comprise measurements of the current and/or measurements of the voltage and/or measurement of the angular position of a rotor of the electric motor.

The four electromechanical actuators 23 of the brake are distributed in two distinct groups 24, each of two electromechanical actuators. Each control channel 17 is arranged to control one of the two groups 24 of electromechanical actuators. Thus, the loss of one of the control channels 17, e.g. resulting from a failure of an electrical component of the electrical braking control module 18, of the electrical motor control module 19, or of the electrical converter module 20 of said control channel 17 can lead to the loss of only half of the braking of the wheel.

In some embodiments, each electromechanical actuator 23 is connected to the junction box 13 via a power cable 25 that conveys the electrical power supply Pea, and via a control cable 26 that conveys the analog motor command signals Sam.

The control cables 26 for two electromechanical actuators 23 of the same group 24 of electromechanical actuators are connected to an electrical converter module 20 of the same control channel 17.

The power module of each electromechanical actuator 23 receives the electrical power supply Pea and the analog motor command signals Sam. The electrical power supply Pea powers the inverters of the power module, which are controlled by the analog motor command signals Sam. The power module then generates three-phase electricity for the stator of the electric motor.

In some embodiments, the electromechanical actuators 23 are arranged to transmit return analog signals Sa to the junction box 13 via the control cables 26. The return analog signals Sa comprise the measurements taken by the sensors of the electromechanical actuators 23. The return analog signals Sa serve in particular to enable the electrical braking command module 18 and the electrical motor command module 19 of each control channel 17 to implement respectively the high level braking control relationships and the motor servo-control loops.

It will be appreciated that one of the advantages of the above-described architecture 10 relates to the problem of dissimilarity. In this example, braking and the motor are controlled in the junction box 13. These digital functions require one or more complex electrical components, and the use of such components requires dissimilarity (i.e. two dissimilar channels). Implementing dissimilarity in the junction box 13 or in the computer 11 is much simpler than implementing it, by way of example, in an electromechanical actuator 23 within which the control of the motor and/or of braking might be performed. In further embodiments, implementing dissimilarity in an electromechanical actuator 23 would amount to making the electromechanical actuator 23 significantly more complex. The number of electrical components within the electromechanical actuator 23 would be increased as would its volume, its weight, and its cost, and it would be necessary to address complex management of interactions between the two channels, etc.

It will also be appreciated that the junction box 13 is conventionally already present in traditional braking system architectures. The usual role of the junction box 13 is to distribute to each electromechanical actuator 23 the cabling that comes from a harness running along the leg of the undercarriage so as to provide the electrical power supply Pea to the electromechanical actuators 23. In the disclosure, an existing junction box 13 is thus provided with functions that are novel and innovative, without modifying to any great extent the mechanical interfaces of an existing junction box 13.

Figure 1:
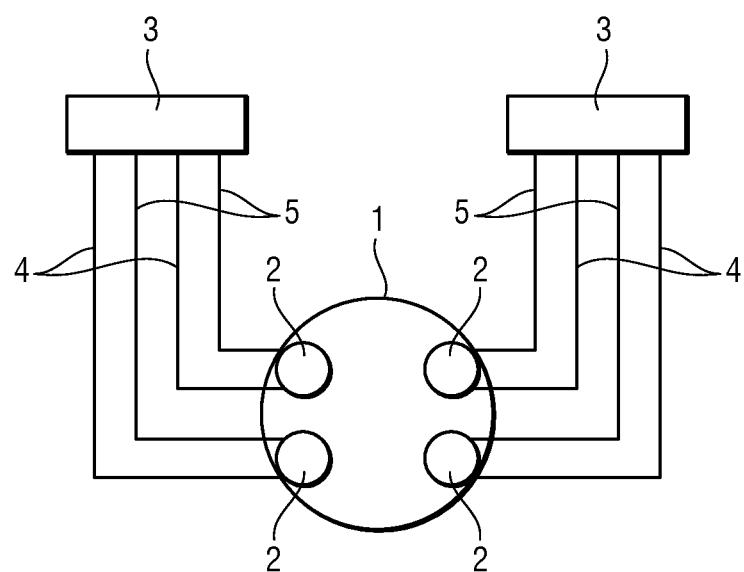
FIG. 1 shows a prior art architecture for a braking system.

Thus, compared with the architecture of FIG. 1, a centralized computer 3 is eliminated without adding any additional equipment or line replaceable unit (LRU).

The elimination simplifies and thus reduces the costs of integrating the architecture for an aircraft braking system.

Figure 3:
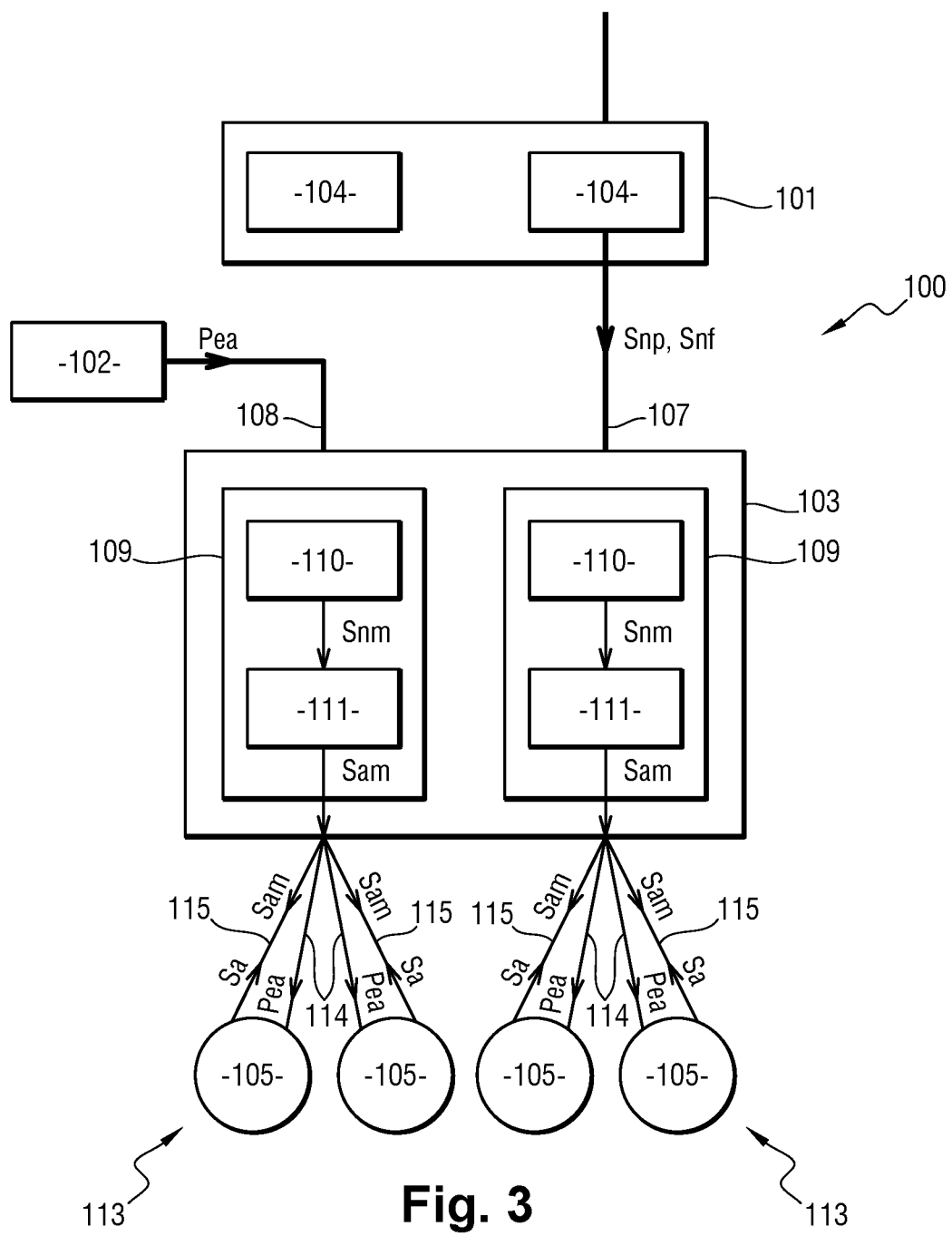
FIG. 3 shows another representative embodiment of an architecture for a braking system in accordance with one or more aspects of the present disclosure.

With reference to FIG. 3, an architecture 100 for an aircraft braking system in accordance with another embodiment of the disclosure comprises a computer 101, a power unit 102, a junction box 103, and a brake of a wheel of a main undercarriage.

The computer 101 is once more integrated in an avionics network of the aircraft and is positioned in a bay situated in the fuselage of the aircraft. The computer 101 has two electrical braking control modules 104. The two electrical braking control modules 104 are dissimilar and distinct, with no electric interaction between them.

The computer 101 acquires a braking setpoint. The braking setpoint is generated by a computer of the ATA42 (not shown) on the basis of a braking order, itself generated by way of example by a pilot of the aircraft or by an automatic braking system.

Each electrical braking control module 104 receives the braking setpoint and implements high level braking control relationships in order to reduce digital braking command signals Snf.

The computer 101 thus produces digital control signals Snp comprising the digital braking command signals Snf produced by both electrical braking control modules 104.

It will be appreciated that the digital braking command signals Snf produced by each electrical braking control module 104 serve to control two electromechanical actuators 105 of the brake. Thus, the loss of one electrical braking control module 104, e.g. caused by a failure of an electrical component of said electrical braking control module 104, would lead to a loss of braking corresponding to half of the braking of the wheel. Nevertheless, provision can be made for each electrical braking control module 104 to be capable of controlling some other number of electromechanical actuators 105 of the brake, and possibly all of the electromechanical actuators 105 of the brake. Thus, the loss of one electrical braking control module 104 need not lead to the loss of any braking.

In the illustrated embodiment of FIG. 3: the power unit 102 is similar to the unit described above; the junction box 103 is once more situated on the main undercarriage; and the junction box 103 is connected to the computer 101 via a digital bus 107 and to the power unit 102 via a power cable 108.

The junction box 103 firstly comprises distribution components (not shown). The distribution components are connected to the power cable 108 and they are arranged to receive and to distribute the electrical power supply Pea to the brake.

In some embodiments, the junction box 103 also has two dissimilar and distinct control channels 109 without any electrical interaction between them.

In this embodiment, each control channel 109 includes an electrical motor control module 110 and an electrical converter module 111. The electrical motor control module 110 is positioned upstream from the electrical converter module 111.

In some embodiments, in each control channel 109, the electrical motor control module 110 acquires the digital braking command signals Snf from the computer 101 via the digital bus 107, and it implements motor servo-control loops for producing digital motor command signals Snm. The digital motor command signals Snm are thus produced from the digital braking command signals Snf, and thus from the digital control signals Snp comprising the digital braking command signals Snf produced by the two electrical braking control modules 104.

In some embodiments, the electrical converter module 111 comprises a digital-to-analog converter. The electrical converter module 111 acquires the digital motor command signals Snm and converts the digital motor command signals Snm into analog motor command signals Sam.

It will be appreciated that the junction box 103 also exchanges information with the computer 101 over the digital bus 107.

The brake serves to brake or slow the rotation of the wheel of the aircraft. The brake comprises an actuator carrier having four electromechanical actuators 105 mounted thereon together with friction members, specifically a stack of carbon disks.

The electromechanical actuators 105 are similar to those described above.

The four electromechanical actuators 105 of the brake are arranged as two distinct groups 113 of electromechanical actuators. Each control channel 109 is arranged to control one of the two distinct groups 113 of electromechanical actuators. Thus, the loss of one control channel 109, e.g. caused by a failure of an electrical component of the electrical motor control module 110 or of the electrical converter module 111, can lead to the loss of only half of the braking of the wheel.

Each electromechanical actuator 105 is connected to the junction box 103 by a power cable 114 that conveys the electrical power supply Pea, and by a control cable 115 that conveys the analog motor command signals Sam.

In some embodiments, the control cables 115 of both electromechanical actuators 105 in a single group 113 of electromechanical actuators are connected to an electrical converter module 111 of a single control channel 109.

The power module of each electromechanical actuator 105 receives the electrical power supply Pea and the analog motor command signals Sam. The electrical power supply Pea powers the inverts of the power module, which are controlled by the analog motor command signals Sam. The power module then generates the three-phase electrical power for the stator of the electric motor.

The electromechanical actuators 105 are arranged to transmit return analog signals Sa to the junction box 103 via the control cables 115. The return analog signals Sa comprise the measurements taken by the sensors of the electromechanical actuators 105.

The return analog signals Sa serve in particular to enable the electrical braking control modules 104 and the electrical motor control modules 110 to implement respectively the high level braking control relationships and the motor servo-control loops.

Naturally, this architecture 100 has the same advantages as the architecture 10 for an aircraft braking system of the first embodiment of the disclosure.

It will be appreciated that the computer of an architecture covered by the disclosure can manage the braking of an arbitrary number of brakes of the wheels of an arbitrary number of undercarriages. Naturally, it is also possible to have a plurality of computers for one or more brakes of wheels in a single undercarriage or in a plurality of undercarriages. With the architecture of the second embodiment of the disclosure, each computer may have an arbitrary number of electrical braking control modules.

Likewise, in some embodiments, the power unit can power the electric motors of an arbitrary number of electromechanical actuators positioned on one or more brakes of wheels of one or more undercarriages. It is also possible to have a plurality of power units for powering the electric motors of the electromechanical actuators of a single brake.

Likewise, a junction box may be connected to an arbitrary number of electromechanical actuators of one or more brakes of wheels of an undercarriage. A junction box may have an arbitrary number of control channels, each connected to an arbitrary number of electromechanical actuators of one or more brakes of wheels of an undercarriage.

In this description, it is stated that the two control channels 17, the two electrical braking control modules 104, and the two control channels 109 are dissimilar and distinct in pairs, without any electrical interaction between them. Naturally, in some embodiments, these channels and modules to be duplicated and dissimilar in full. However, in other embodiments, only portions of the channels and modules to be duplicated. Thus, by way of example, in the architecture of the first embodiment of the disclosure, provision may be made for the electrical braking control module 18 to be common to both control channels 17.

In other embodiments only portions of the duplicated channels and modules to be dissimilar. Thus, by way of example, in the architecture of the first embodiment of the disclosure, provision may be made for the electrical motor control modules 19 not to be dissimilar, so that the dissimilarity comes from some other portion of the control channels.

Finally, in some embodiments the channels and modules to be neither duplicated and and/or nor dissimilar.

It will be appreciated that any logic carried out by the electrical braking control module 18, the electrical motor control module 19, the electrical braking control module 104, and/or the electrical motor control module 110 among other components described herein can be implemented in either hardware or software or a combination of hardware and software. In some embodiment, some or all of the functionality of these components can be carried out by, for example, digital logic circuits. In other embodiments, some or all of the functionality of these components can be carried out by, for example, a suitably programmed microprocessor, an ASIC, a system on a chip (SoC), one or more FPGAs, etc.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An architecture for an aircraft braking system, the architecture comprising:
   a brake configured to brake a wheel of an undercarriage of the aircraft, the brake comprising friction members and electromechanical actuators for applying a braking force to the friction members to exert a braking torque on the wheel, each electromechanical actuator comprising an electric motor and a power module;

a computer disposed in a fuselage of the aircraft and configured to produce digital control signals;

a power unit disposed in the fuselage of the aircraft and configured to produce an electrical power supply for powering the electric motors; and a junction box situated on the undercarriage, the junction box connected to the computer, the power unit, and the electromechanical actuators, wherein the junction box is configured to receive the electrical power supply and to distribute the electrical power supply to the electromechanical actuators, wherein the junction box has an electrical motor control module configured to produce digital motor command signals from the digital control signals, and wherein the junction box has an electrical converter module configured to convert the digital motor command signals into analog motor command signals for the power modules of the electromechanical actuators.

2. The architecture of claim 1, wherein the junction box includes an electrical braking control module positioned upstream from the electrical motor control module, and wherein the digital control signals comprise a braking setpoint.

3. The architecture of claim 1, wherein the computer includes an electrical braking control module, and wherein the digital control signals comprise digital braking command signals.

4. The architecture of claim 1, wherein the junction box includes two control channels, and wherein the electromechanical actuators of the brake of the wheel are arranged in two groups of electromechanical actuators, each control channel including an electrical motor control module and an electrical converter module, and each control channel being arranged to control one of the two groups of electromechanical actuators.

5. The architecture of claim 2, wherein each control channel further includes an electrical braking control module.

6. The architecture of claim 3, wherein the computer includes two electrical braking control modules that are dissimilar.

7. The architecture of claim 4, wherein the control channels are dissimilar.

8. The architecture of claim 1, wherein the electromechanical actuators are arranged to transmit return analog signals to the junction box.

9. The architecture of claim 8, wherein the return analog signals comprise measurements selected from the group consisting of current, voltage, and rotor angular position.

10. The architecture of claim 1, wherein the analog motor command signals comprise pulse width modulation signals.

11. The architecture of claim 1, wherein the junction box is connected to at least two electromechanical actuators of two brakes of two distinct wheels, the junction box producing analog motor command signals for the power modules of the two electromechanical actuators.

* * * * *